(12) United States Patent
Mallonee et al.

(10) Patent No.: US 7,727,389 B1
(45) Date of Patent: Jun. 1, 2010

(54) SYSTEM FOR REMOVING HYDROCARBONS AND CONTAMINATES

(75) Inventors: Doug Mallonee, Mobile, AL (US); Edward Beverly Moe, Montgomery, TX (US)

(73) Assignee: Green Intectuac Properties, Mobile, AL (US)

( * ) Notice: Subject to any disclaimer, the term of this patent is extended or adjusted under 35 U.S.C. 154(b) by 0 days.

(21) Appl. No.: 12/562,905

(22) Filed: Sep. 18, 2009

(51) Int. Cl.
*C02F 1/02* (2006.01)
*C02F 9/10* (2006.01)

(52) U.S. Cl. .................. 210/182; 210/202; 210/209; 210/241; 210/242.1; 210/258

(58) Field of Classification Search ............ 210/143, 210/175, 177, 178, 179, 207, 208, 252, 258, 210/259, 294, 319, 512.1, 512.2, 519, 520, 210/182, 202, 209, 241, 242.1; 166/75.11; 175/206, 207, 217, 218; 196/14.52, 46.1; 208/390
See application file for complete search history.

(56) References Cited

U.S. PATENT DOCUMENTS

| | | | |
|---|---|---|---|
| 5,192,423 A | 3/1993 | Duczmal et al. | |
| 5,344,255 A | 9/1994 | Toor | |
| 5,570,749 A * | 11/1996 | Reed | 175/207 |
| 2003/0136747 A1 | 7/2003 | Wood et al. | |
| 2005/0109715 A1 | 5/2005 | Stoy et al. | |
| 2009/0156877 A1 | 6/2009 | Newman et al. | |

* cited by examiner

*Primary Examiner*—Matthew O Savage
*Assistant Examiner*—Lucas Stelling
(74) *Attorney, Agent, or Firm*—Buskop Law Group, PC; Wendy Buskop

(57) ABSTRACT

A system for removing hydrocarbon and heavy metals from dirt, coal tar, sludge, slurries and aqueous particulates having three mobile units including: a hydrocarbon removal mobile unit, a heating and power support unit, and a clarifying mobile unit.

30 Claims, 14 Drawing Sheets

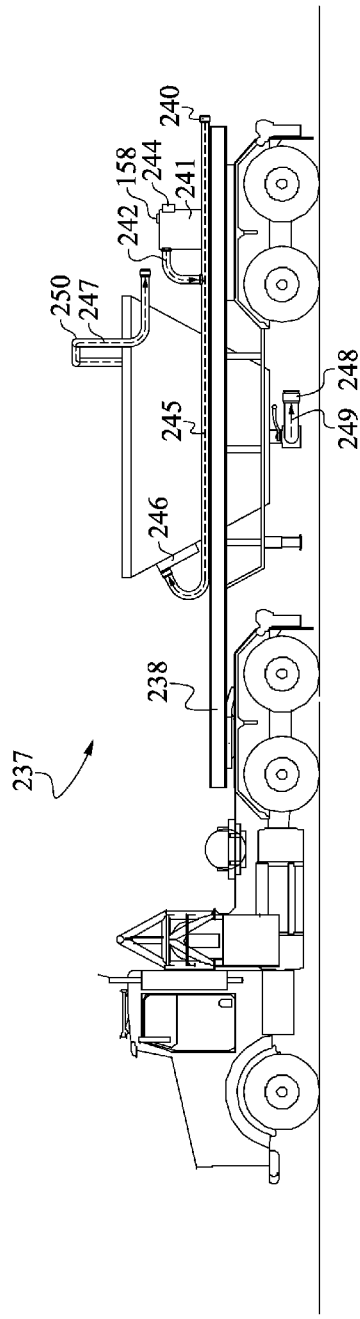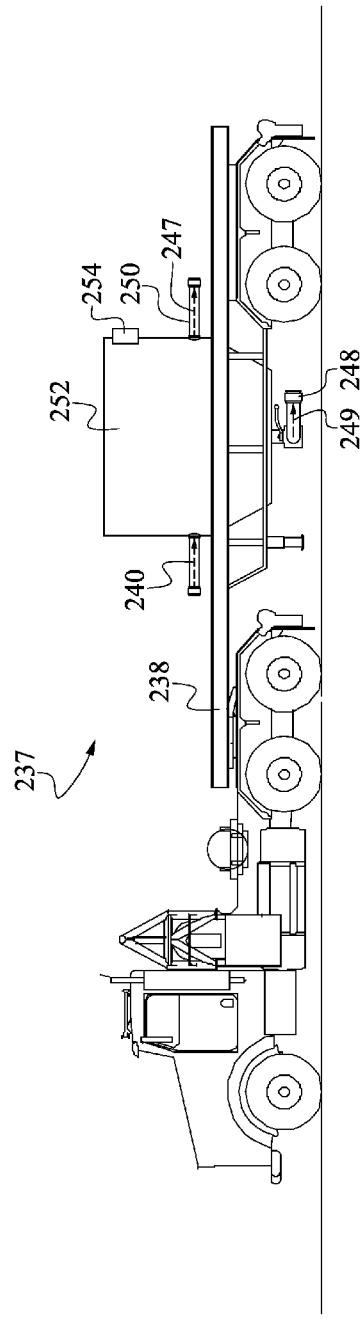
FIGURE 13A
FIGURE 13B

SYSTEM FOR REMOVING HYDROCARBONS AND CONTAMINATES

FIELD

The present embodiments generally relate to a portable system for removing hydrocarbons and/or heavy metals from soil, particulate, sludge, or liquids. The portable system can be modular and transportable.

BACKGROUND

A need exists for a trailerable modular system that uses a separate trailerable power unit and a separate modular, trailerable clarifier unit or a trailerable centrifuge unit instead of the clarifier unit, to remove heavy metals and/or hydrocarbons from dirt or particulate.

There is a need for a system that is less liable to pollute and can produce clean particulate immediately (within a few minutes) of multiple sizes of clean particulate usable immediately essentially simultaneously.

A further need exists for a compact multi-trailer system that can move on a roadway without permits, but can remove hydrocarbons and heavy metals from dirt, sludge, or aqueous particulate in different configurations, such as L shapes or T-Shapes.

A need exists for a system for creating multisized clean particulate simultaneously using a floating system that is relocatable to other locations easily.

The present embodiments meet these needs.

BRIEF DESCRIPTION OF THE DRAWINGS

The detailed description will be better understood in conjunction with the accompanying drawings as follows:

FIG. 13A depicts an embodiment of an illustrative clarifying mobile unit.

FIG. 13B depicts another illustrative clarifying mobile unit.

Figure 1:
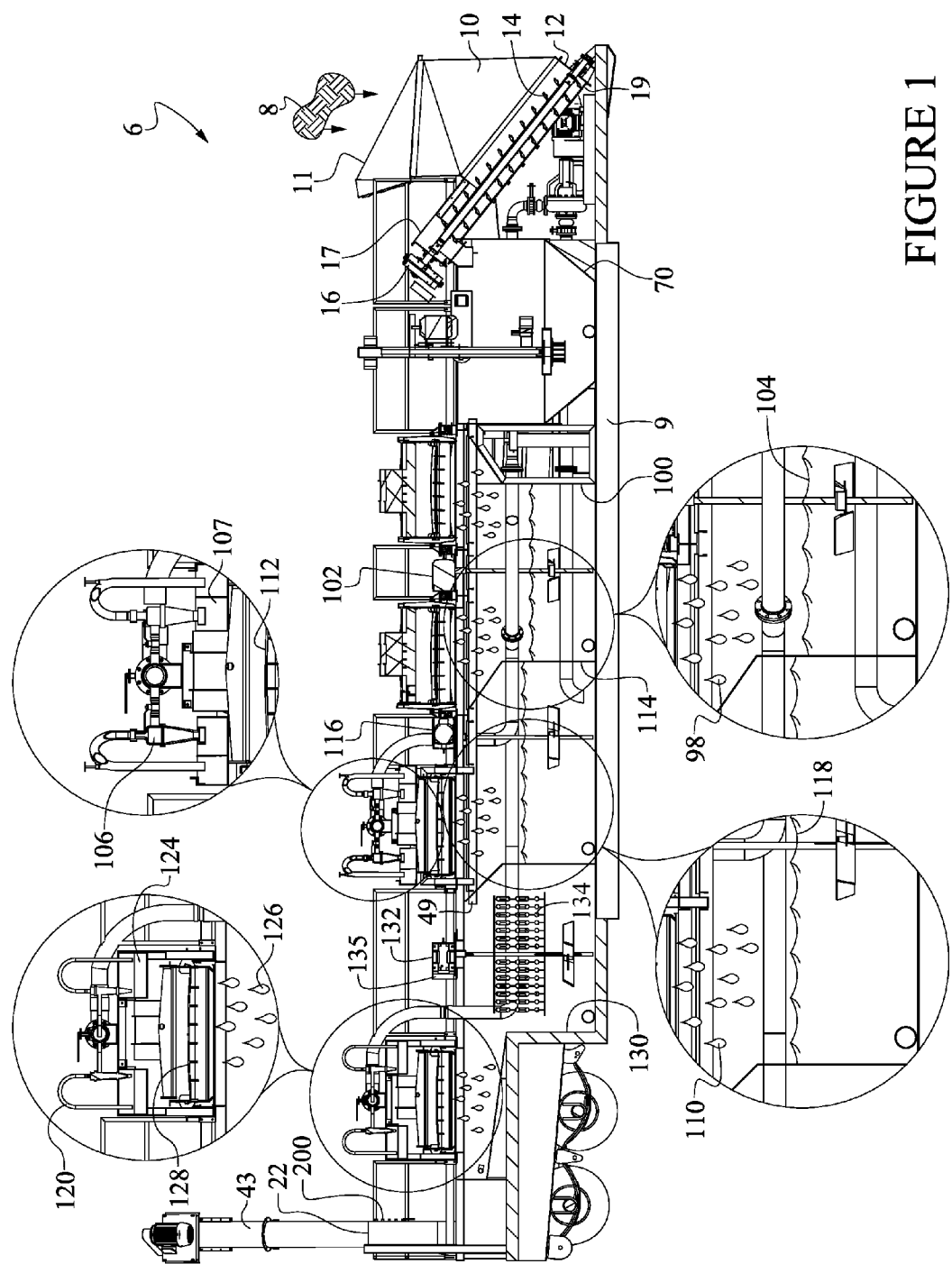
FIG. 1 is a side view of the trailer mounted unit.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

The present embodiments relate to a system for removing hydrocarbons and/or heavy metals from soil, particulate, sludge, or liquids.

The recovered hydrocarbons can be oil or fuel which can then be used as biodiesel or as oil in the reusable oil market.

It is contemplated that embodiments can remove heavy metals, including dissolved heavy metals from soil or similar particulate.

Each embodiment can remove oil from coal tar sands quickly without polluting the surrounding soil, or damaging the surrounding soil with a permanent structure.

The invention is fast and can process thirty tons of soil per hour.

The soil processable by this system can be sand, rock, particulate or combinations of these materials. The soil can also be a wet mixture, such as a wet mixture with water, a wet mixture mixed with another diesel fuel, mixed with particulate with liquid hydrocarbons.

The embodiments relate to a portable system, with each unit being trailer mounted and highway legal. A tractor can move each trailer mounted unit without need for extra permits.

In an embodiment, the system can be skid mounted, that is, the two major components can be portable but fixed to moveable skids.

The water used within an embodiment of the invention to process the dirt can be recyclable as a closed loop, and as such, will not create waste water.

Each embodiment discloses a system that can be a low pressure apparatus. The embodiments can provide a safe system using less than 100 psi and as low as 30 psi for the treatment of sludge and aqueous solids. Thus, the system can be safe for humans to be near to without fear of explosion.

In one or more embodiments, the system can sustain a higher pressure, such as 150 psi, or even 200 psi, but remain a controllable pressure.

The invention can use steam to create the hydrocarbon removal in an effective manner, as a heating component and as a separation facilitator.

A benefit of the embodiments is that the user of the apparatus no longer has to take particulate to a landfill. Moreover, the particulate can be used as top soil, fill dirt, or playground material immediately and without further treatment, which is another benefit of the invention.

Hydrocarbons of the apparatus can be used for cogeneration processes immediately after treatment without further need of separation processing for a fast, easy method to create usable fuel.

The invention specifically relates to a hydrocarbon removal mobile unit that has a hopper with a capacity from 0.25 tons to several tons of dirt.

The hopper has a hopper top wider than a hopper bottom, forming a V-shape or funnel-shaped device.

The hopper receives dirt or sludge or aqueous particulate; such materials are referred to herein as "input material."

An auger can be used to move input material from the hopper lower end upwardly.

The auger can be a shaftless auger or a shafted auger.

The auger is herein referred to as the "rotating material moving device" disposed in the hopper for ensuring continuous flow of input material from the hopper, allowing 24/7 (24 hours a day, 7 days a week) continuous processing of the input material or dirt, which can include coal tar sand.

The rotating material moving device can be connected to a gear box with forward, neutral and reverse gears, and to a rotating material moving device motor, which can be a variable speed motor.

In an embodiment, the rotating material moving device has a sleeve around it for moving the input material in a contained manner from the bottom of the sloped, v-shaped hopper to the top. The sleeve can be a removable sleeve.

The rotating material moving device has a device top at the top of the hopper and a device bottom proximate to the bottom of the hopper at the most narrow point of the hopper.

The rotating material moving device can be oriented at an angle with a slope 20 to 60 degrees from the hopper axis from bottom to top.

A controller can communicate with the material moving motor and variably control the speed of the material moving motor. The controller can communicate with a main control panel also located on the trailer.

In an embodiment, the trailer can be a barge or other floating support vessel that floats such as a floating platform, or a similar floating vessel, such as a drill ship or a heavy lift vessel, such as those operated by Jumboship.NL™ of Rotterdam, the Netherlands.

A plurality of injection ports can be positioned adjacent to the rotating material moving device in the hopper for introducing a first fluid, such as steam, to the input material forming a first slurry.

The slurry can then flow or move into a separation tank. The separation tank agitates the slurry, allowing particulate to settle, forming contaminate and particulate effluent.

An initial separation section can receive the first slurry in the separation tank, and the first slurry can be moved using a device such as a 1500 gpm pump offered by Triflow International of Houston, Tex.

The initial separation section can have an adsorbent or an absorbent. In another embodiment, a filter can be used with the contaminant in the initial separation section to remove contaminates.

The separation tank pump can be connected to a fluid supply loop and a fluid injection port for injecting fluid into the first slurry of the hopper to make the separation faster and to recycle the water used in the process.

The separation tank can have a separation tank outlet port for flowing the effluent out of the separation tank.

The separation tank can have an agitator port for recalculating the first slurry from the initial separation section through the fluid supply loop. The agitator port can agitate fluid without the need of a bladed mixer.

Contaminant can flow to a contaminate recovery section that can be in fluid communication with the initial separation section. There can be a plurality of contaminate recovery sections.

The contaminant recovery section removes contaminate separated from the separation tank.

An extractor can be associated with each contaminate recovery section for soaking up hydrocarbons in the contaminate.

The extractor can be the adsorbent, the absorbent, or a filter with material to remove the hydrocarbons, or heavy metals.

A separator can be disposed between the initial separation section and the contaminate recovery section. The separator can be made from steel, rubber, and or other materials. The separator can have a plurality of paddle wheels, a bar with a series of nozzles for providing a spray, or an elongated member configured to move the contaminates to the contaminate recovery section.

An embodiment contemplates that a water spray bar can be attached to an edge proximate the top of the separation tank to allow hydrocarbons to flow to the separator for an easy introduction of the water.

Still another embodiment contemplates that the separator can be a weir, or a weir with a rotating paddle wheel, or a rotating paddle wheel engaging the contaminate and moving it along to the contaminate recovery section.

At least one scalper screen receives particulate effluent and separates the effluent into a first hydrocarbon extracted particulate with a diameter greater than 1000 microns and forms a second slurry. The scalper screen can receive the effluent and screens off the first hydrocarbon extracted particulate allowing the second slurry with less than 1000 microns to traverse to the scalper tank, and the first hydrocarbon extracted particulate larger than or equal to 1000 microns to traverse to the ancillary location and/or a material removal device.

At least one scalper tank with a scalper agitator can receive the second slurry and keep the second slurry in suspension.

The second slurry can be formed into a third slurry by removing a second hydrocarbon extracted particulate with a diameter greater than 75 microns. The second hydrocarbon extracted particulate with a diameter greater than 75 microns can be extracted using at least one de-siltering hydrocyclone. For example, one or more de-siltering hydrocyclones can receive the second slurry suspension and remove the second hydrocarbon extracted particulate with a diameter greater than 75 microns, forming the third slurry. The de-silting hydrocyclone can be any hydrocyclone used in the art.

A desilting screen receives the second hydrocarbon extracted particulate and screens off the second hydrocarbon extracted particulate allowing the third slurry with less than 75 microns to traverse to the desilting tank, and the second hydrocarbon extracted particulate larger than or equal to 75 microns to traverse to the ancillary location and/or a material removal device.

The desilting tank can have a desilting agitator, which can be used to create an agitated third slurry.

A plurality of clay extractors can receive the agitated third slurry and remove a third hydrocarbon extracted particulate with a diameter greater than 10 microns to form a fourth slurry.

A clay screen can receive the third hydrocarbon extracted particulate and screen off the third hydrocarbon extracted particulate allowing the fourth slurry with less than 10 microns to traverse to the clay slurry tank, and the third hydrocarbon extracted particulate larger than or equal to 10 microns traverses to the ancillary location and/or a material removal device.

The clay slurry tank with clay agitator receives the fourth slurry and heats the fourth slurry with a heating device connected to the controller, forming a heated forth slurry. The heated fourth slurry flows to a desilting tank, at least one of the scalper tanks, the initial separation section, or combinations thereof.

In one or more embodiments, the system can have a main control panel with at least two circuit breakers connected to a circuit board. The main control panel can be used to actuate, stop, and variably control the system using a power supply on board the trailer; including the plurality of agitators and the plurality of pumps.

In one or more embodiments, the controller can have a processor powered by a controller power supply. The processor can be connected to data storage. The data storage of the controller can have computer instructions that instruct the controller processor to increase or decrease the speed of the material moving motor, to increase or decrease the speed at which the rotating material moving device rotates, or to increase or decrease the rate of flow of particulate through the entire process.

Still another embodiment contemplates that a remote control can be used with the controller, and the remote control can provide instructions to the controller while being operated a distance from the trailer. For example, the remote control can communicate with the controller via wireless or wired telemetry, such as radio frequency, fiber optics, or microwaves.

In an embodiment, the controller can include a controller transmitter/receiver for receiving communication signals to cause the various motors and pumps on the trailer or floating barge to start, stop, speed up, or slow down.

In one or more embodiments a remoter control can be in communication with or connected to the controller. The remote control can have a remote control transmitter/receiver for providing wireless remote control signals to the controller to cause the motors and pumps to start, stop, speed up, or slow down. The remote control can be a wired pendant remote control or a wireless remote control in different embodiments.

The remote control can include a remote control circuit board connected to a remote control power supply. The remote control circuit board can communicate with at least one of the remote control transmitter/receiver, a remote control on/off switch, an increase speed potentiometer, a decrease speed potentiometer, and a display.

The remote control can have, in a different embodiment, an "on switch", an "off switch", and a "speed control knob" for transmitting increase or decrease speed signals to the controller, which is especially easy to use particularly for the handicapped.

An embodiment contemplates using a material moving motor emergency stop directly connected to or otherwise connected with the material moving motor.

Another embodiment contemplates having a trough disposed around the rotating material moving device for assisting in flowing the input material to the separation tank.

The first fluid can be injected into the input material from a first fluid reservoir.

The first fluid reservoir can contain a vapor, such as steam, a liquid, such as an amine containing emulsion breaker liquid, diesel oil, or a combination thereof.

Yet another embodiment contemplates that a removable sleeve disposed within the trough and further supporting the plurality of injection ports can be used. The removable sleeve can be from about 0.01 inches to about 250 inches long with a wall thickness between about 0.25 inches to about 1 inch and made of steel or another non-deforming high weight supporting material, such as a rib reinforced polymer. In one or more embodiments, the removable sleeve can extend from one end of the trough to an opposite end of the trough longitudinally or laterally.

The removable sleeve can be made from or at least coated with a hard sliding material such as Teflon™. The removable sleeve can have a diameter greater than the rotating material moving device and less than the trough. The removable sleeve can be high density polyethylene with a thickness between about 0.25 inches to about 1 inch.

It should be noted that for the embodiment where the auger can be shaftless, a plurality of helical flightings can be used on the auger to move the dirt or particulate from the hopper to the separation tank.

In an embodiment, the first fluid can be a heated fluid, such as a fluid heated from a remote boiler or similar heating device to a temperature from about 50 degrees Fahrenheit to about 550 degrees Fahrenheit.

A desilting trough can be used in an embodiment to receive the third slurry from the desilting hydrocyclone and pass the third slurry to the desilting tank. The desilting trough can have a length of from about 25 feet to about 50 feet, an inner diameter from about 0.25 feet to about 30 feet, and a wall thickness from about 0.30 inches to about 1 foot.

Yet another embodiment contemplates using a clay trough for receiving the fourth slurry from the clay extractors and for passing the fourth slurry to the clay slurry tank to prevent spillage and facilitate movement of the fluid. An embodiment contemplates that between 20 clay extractors to 60 clay extractors can be used when using the clay extractors. In one or more alternative embodiments, a pump, such as a centrifugal pump, which is referenced herein as the "fourth slurry pump" can be used instead of the clay trough.

The embodiment contemplates the heating device can be a fin fan heater having a heated fluid as the heat transfer medium or another heat exchanger having a heated fluid as the heat transfer medium. The heating device can either directly or indirectly exchange heat with the clay slurry.

At least one light can be used for night time to maintain continuous use of the system. The light can be connected to the power supply.

In embodiments, walls of the clay slurry tank can extend higher than the desilting tank but allow fluid from the clay slurry tank to flow into the desilting tank when fluid in the clay slurry tank exceeds a preset limit.

In embodiments, walls of the desilting tank can extend higher than the scalper tank but allow fluid in the desilting tank to flow into the scalper tank when fluid in the desilting tank exceeds a preset limit.

In embodiments, the fourth slurry can flow into a fluid trough for recycling into the separation tank.

It is contemplated that in embodiments the rotating material moving device can be a rotating auger.

It is also contemplated in embodiments that the extractor can be a filter pump connected to or in fluid communication with at least one contaminate recovery section second outlet for flowing contaminate from the contaminate recovery section through a filter, forming a recycle fluid. The recycle fluid can then be reintroduced to the initial separation section, a scalper tank, a desilting tank, the clay slurry tank, or combinations of these tanks in sequence or simultaneously. The extractor can be an adsorbent, an absorbent, a mechanical device, any other chemical or device described herein, or combinations thereof.

It is further contemplated that the extractor can have an adsorbent material, an absorbent material, or combinations thereof. The adsorbent or absorbent can be disposed in each contaminate recovery sections or a first adsorbent and a second absorbent can be disposed in adjacent walled off contaminate recovery sections for recovery of different contaminants with different concentrations or components.

It is contemplated that separation trailer can include a rotating material removal device for receiving first hydrocarbon extracted particulate, second hydrocarbon extracted particulate, and third hydrocarbon extracted particulate and flowing the hydrocarbon extracted particulates to an ancillary location.

In an alternate embodiment the hydrocarbon removal mobile unit can be a floating hydrocarbon removal mobile vessel, such as a custom built barge with tanks that are made from the hulls of the vessel. In another embodiment, the hydrocarbon removal mobile unit can be mounted on a floating support vessel and have replaceable modular components.

The system can comprise a heating and power support unit for connecting to the hydrocarbon removal mobile unit providing power and a heated second fluid to the first trailer.

The heating and power support unit can comprise a trailer, a generator disposed on the trailer, and a fuel tank disposed on the trailer. The fuel tank can be in communication with the generator.

The heating and power support unit can further comprise a boiler in communication with the generator, a fluid intake in the boiler for receiving second fluid from second fluid source, a heated outlet of the boiler in communication with a heated fluid dispersal manifold on the hydrocarbon removal mobile unit.

The heated second fluid can transfer from the heated fluid outlet to the heated fluid dispersal manifold for further diverting the heated second fluid to the heating device and to the injection ports and for flowing condensed second fluid condensing from the heated second fluid to a boiler heated second fluid return.

The heated fluid dispersal manifold can additionally transfer heated second fluid to the first fluid reservoir for injecting heated second fluid as the first fluid.

The system can comprise a clarifying mobile unit for connecting to the heating and power support unit and the hydrocarbon removal mobile unit.

The clarifying mobile unit includes a clarifying trailer and a slurry inlet port disposed on the clarifying trailer for receiving the fourth slurry. The clarifying mobile unit includes a polymer injector in communication with the slurry inlet port for injecting a polymer into the fourth slurry, forming a polymer slurry.

The clarifying mobile unit can include a flocculation chamber disposed on the clarifying trailer for receiving the polymer slurry, for mixing and separating clarified fluid from the polymer slurry, forming a sludge.

The clarifying mobile unit can include a clarified fluid conduit for flowing the clarified fluid to the flocculation chamber then to the separation tank, and a sludge outlet port for the sludge to flow from the flocculation chamber to the rotating material removal device or to the ancillary location.

It is contemplated that the system includes a dewatering centrifuge to receive the fourth slurry and to apply a centrifugal force for separation of particulate and liquid.

Furthermore, it is contemplated that the system can be disposed on a floating support vessel, forming a floating hydrocarbon removal mobile unit.

The invention contemplates in an embodiment, a floating hydrocarbon removal mobile unit with a first floating support vessel.

The first floating support vessel can have a hopper with a hopper top wider than a hopper bottom. The hopper can also have a hopper axis. The hopper can be used to receive input material mounted to the floating support vessel.

A rotating material moving device can be disposed in the hopper for ensuring continuous flow of input material through the hopper.

The rotating material moving device can be connected to a gear box and a material moving device motor. The rotating material moving device can be disposed in the bottom of the hopper. The rotating material moving device can have a device top and a device bottom, and can be oriented at an angle with a slope of about 20 degrees to about 60 degrees from the hopper axis from the device bottom to the device top. A controller can be connected to the material moving device motor for variably controlling the speed of the material moving device motor.

A plurality of injection ports are adjacent the rotating material moving device at the hopper bottom for introducing a first fluid to the input material forming a first slurry.

A separation tank can be located within the floating vessel, and optionally as a part of the vessel hull, for receiving the slurry, agitating the first slurry and allowing particulate to settle, forming separated contaminate and particulate effluent.

In this floating vessel embodiment, the separation tank includes an initial separation section for receiving the first slurry. A separation tank pump can be disposed within the initial separation section and connected to a fluid supply loop. The initial separation section can also include a water injection port, which can be used to inject water into the first slurry as it flows from the rotating material moving device. A separation tank outlet port, for removing a particulate effluent can also be disposed on or connected to the initial separation section.

An agitator port can re-circulate the first slurry from the initial separation section through the fluid supply loop. A plurality of contaminate recovery sections can be in fluid communication with the initial separation section. Each contaminate recovery section can receive the contaminate from the initial separation section.

An extractor can be associated with each of the contaminate recovery sections, and the extractor can be used to soak up hydrocarbons in the contaminate. The extractor can be an adsorbent, an absorbent, a mechanical device, any other chemical or device described herein, or combinations thereof.

A separator can be disposed between the initial separation section and the contaminate recovery sections.

At least one scalper screen can be used to receive the particulate effluent and separate the particulate effluent into a first hydrocarbon extracted particulate with a diameter greater than 1000 microns and a second slurry.

At least one scalper tank can be adjacent the at least one scalper screen. The scalper tank can have an agitator, which can be use to form a suspension from the second slurry.

At least one de-silting hydrocyclone can be on the barge for receiving the suspension and removing a second hydrocarbon extracted particulate with a diameter greater than 75 microns and forms a third slurry. A desilting screen can be used to receive the second hydrocarbon extracted particulate.

A desilting tank can be adjacent the desilting screen and can contain a desilting agitator for receiving the third slurry and forming an agitated third slurry. The desilting tank can be built into the hull of the floating vessel or otherwise secured to the floating vessel.

A plurality of clay extractors can be used to receive the agitated third slurry and removing a third hydrocarbon extracted particulate with a diameter greater than 10 microns and form a fourth slurry. The plurality of clay extractors can be located on the vessel or otherwise secured thereto.

A clay screen for receiving the third hydrocarbon extracted particulate and a clay slurry tank with clay agitator for receiving the fourth slurry can be on the vessel which further contains a heating device connected to the controller and wherein the heated fourth slurry can be flowed to desilting tank, at least one of the scalper tanks, the initial separation section of the separating tank.

A main control panel actuating and stopping and variably controlling the process using a power supply can be located and built into one end of the vessel hull.

A second floating vessel can be connectable to the first floating vessel and have a heating and power support unit for connecting to the hydrocarbon removal mobile unit first floating vessel. The second floating vessel provides power and a heated second fluid to the hydrocarbon removal mobile unit floating vessel.

The heating and power support unit has a generator disposed on the second floating vessel and a fuel tank in communication with the generator.

A boiler in communication with the generator can be on the second floating vessel. The boiler can have a fluid intake for receiving second fluid from a second fluid source and a heated fluid outlet for floating heated fluids to a heated fluid dispersal manifold disposed on the hydrocarbon removal mobile unit.

A heated second fluid transfers from the heated fluid outlet to the heated fluid dispersal manifold for further diverting the heated second fluid to the heating device and to the injection ports and for flowing condensed second fluid condensing from the heated second fluid to a boiler heated second fluid return.

This embodiment contemplates that a third floating vessel communicates to the second and first floating vessels. The third floating vessel can have a centrifuge or a clarifying mobile unit.

The third floating vessel slurry inlet port can be on the third floating vessel for receiving the fourth slurry.

A polymer injector can be in communication with the slurry inlet port, for injecting a polymer into the fourth slurry, forming a polymer slurry.

A flocculation chamber can be disposed on the second for receiving the polymer slurry, for mixing and separating clarified fluid from the polymer slurry and forming a sludge.

A clarified fluid conduit for flowing the clarified fluid flow the flocculation chamber to the separation tank.

A sludge outlet port for the sludge to flow from the flocculation chamber to the rotating material removal device or the ancillary location.

Turning now to the Figures, FIG. 1 depicts a first of the three trailerable or portable units of the invention. The embodiment of FIG. 1 shows a first trailerable unit which is the hydrocarbon removal mobile unit 6 on a trailer 9.

A hopper 10 is shown removably and modularly mounted to the trailer 9. The hopper 10 is shown with a hopper top 11 and a hopper bottom 12. Input material 8 is depicted flowing into the hopper 10.

The rotating material moving device 14 can be seen at least partially disposed within the hopper 10. The rotating material moving device 14 has a device top 17 and a device bottom 19. A gear box 16 is shown connected to the rotating material moving device.

The separation tank 70 can be used to receive material from the rotating material moving device 14. A scalper tank 100 with a scalper agitator 102, a second slurry 98, and a second slurry suspension 104 is shown.

Also depicted is a desilter tank 114 with a desilting agitator 116, a third slurry 110, and an agitated third slurry 118. Above the desilter tank 114 is a desilting hydrocyclone 106 with a desilting trough 107 and a desilting screen 112.

Clay extractors 120 are shown with a clay trough 124, a fourth slurry 126, a clay agitator 132, and a clay screen 128, all disposed above a clay slurry tank 130. A fluid trough 49 is shown, for moving fluid from the clay slurry tank to the separation tank. A fourth slurry pump 135 is also shown for moving fluid from the clay slurry tank to the separation tank.

Also depicted are a material removal device 43, a controller 22, and a main control panel 200.

Figure 2:
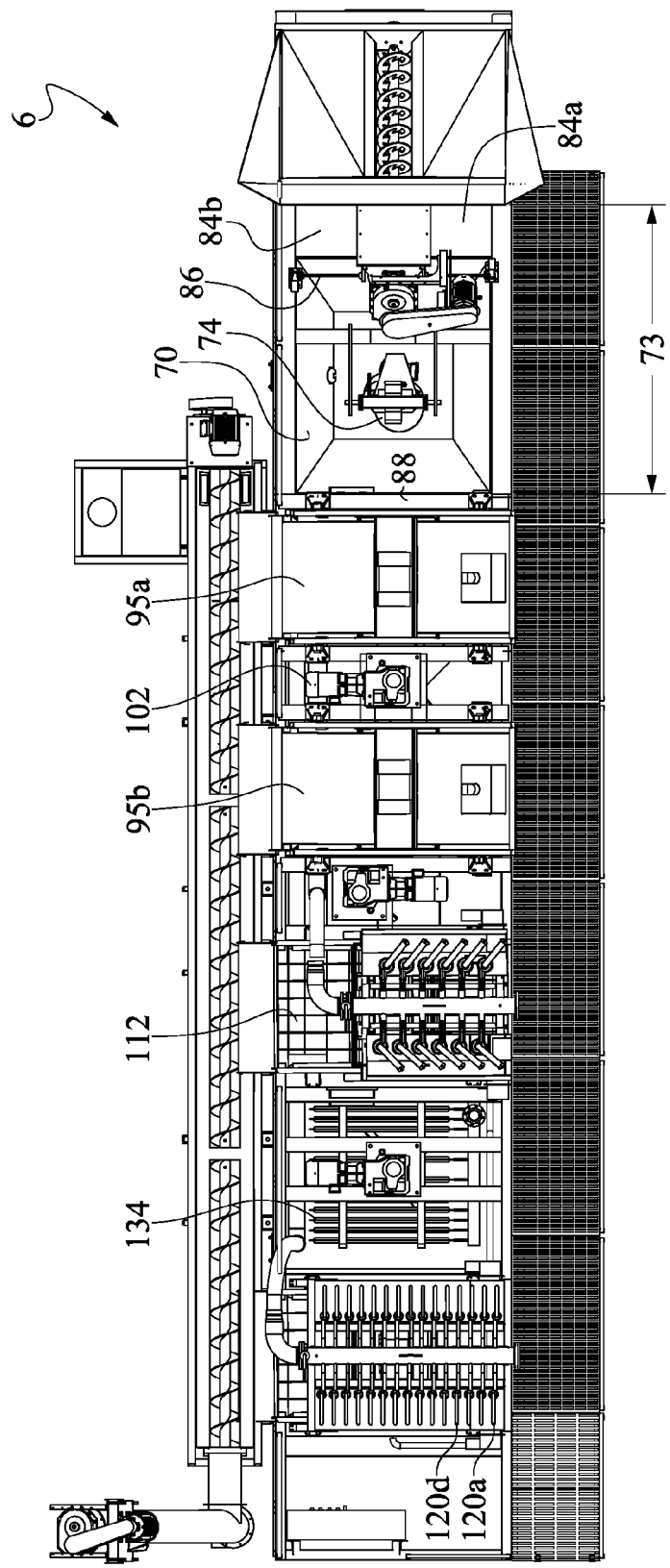
FIG. 2 is a top view of FIG. 1.

FIG. 2 is a top view of an embodiment of the hydrocarbon removal device 6. Contaminate recovery sections 84a and 84b are shown.

Also depicted are a separator 86, a water spray bar 88, an initial separation section 73, a separation tank pump 74, and the separation tank 70.

The hydrocarbon removal device 6 is further depicted with scalper screens 95a and 95b, heating device 134, a scalper agitator 102, a desilting screen 112, and a plurality of clay extractors 120a-120d.

Figure 3:
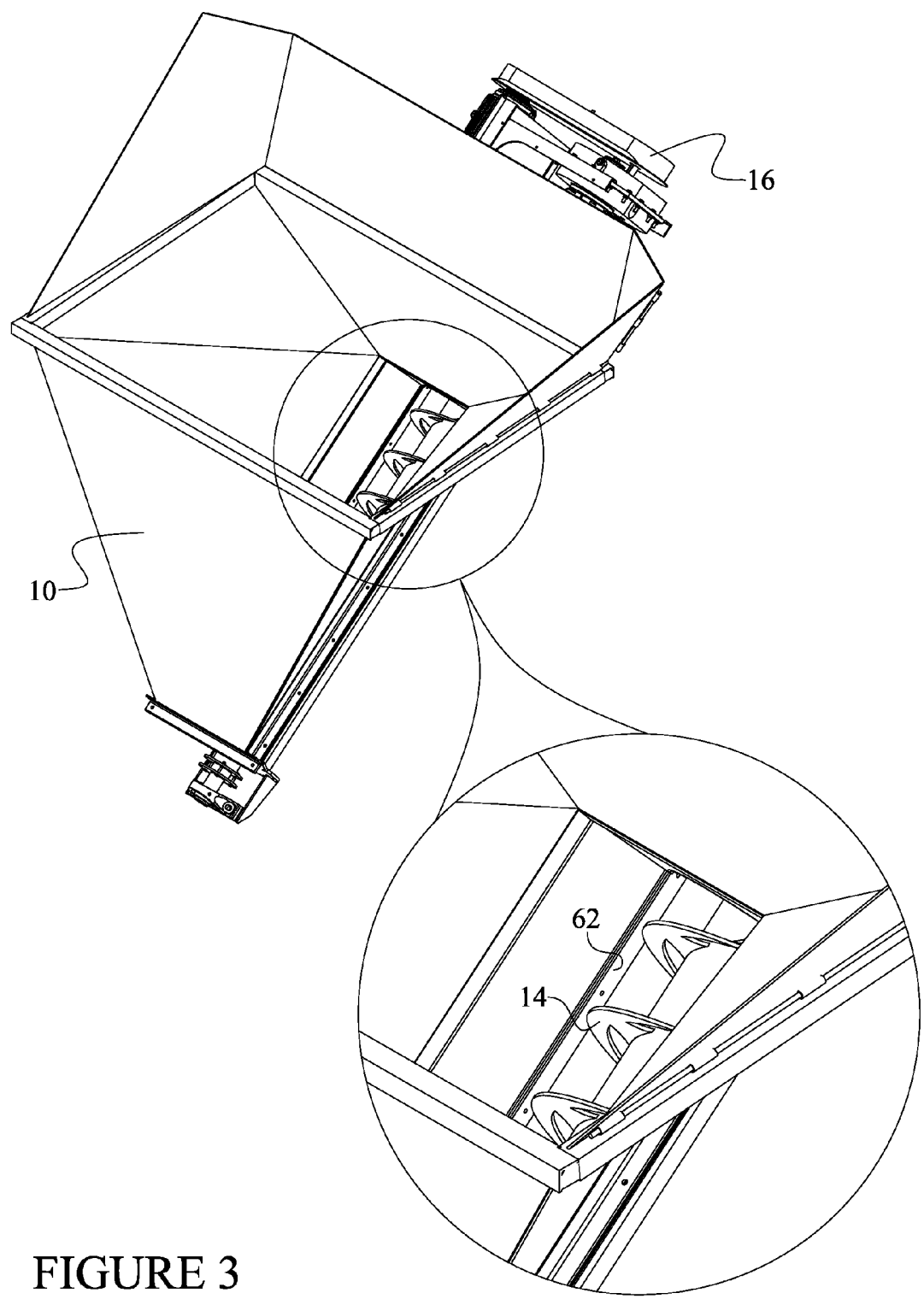
FIG. 3 is a detailed view of an illustrative intake.

FIG. 3 depicts an embodiment of the hopper 10 and the rotating material moving device 14 with the gear box 16 and a removable sleeve 62. The removable sleeve 62 can be disposed within a trough 56 (shown in FIG. 4) disposed around the rotating material moving device 14.

Figure 4:
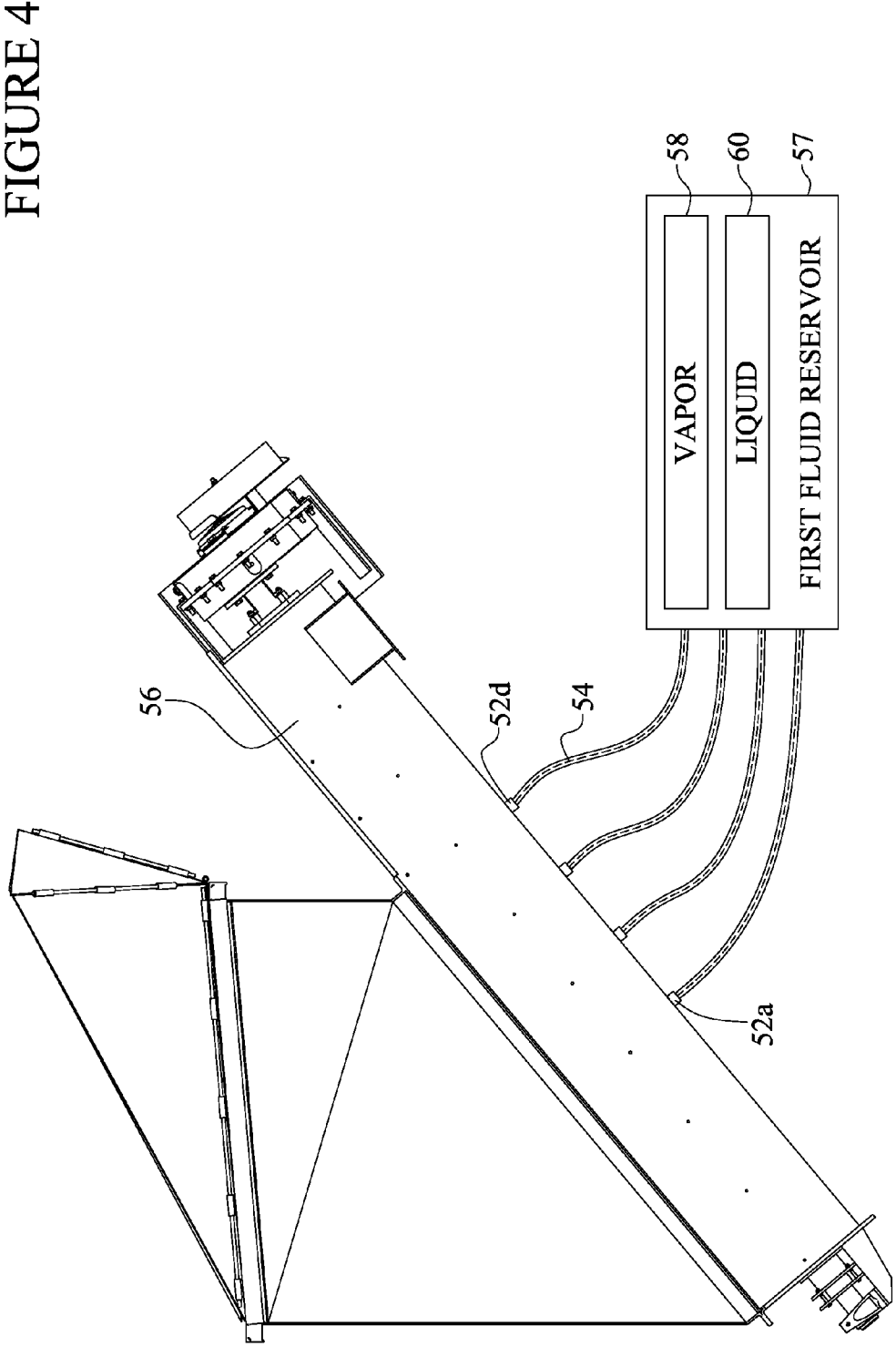
FIG. 4 is a detail of an illustrative sleeve around an auger within an intake portion.

FIG. 4 depicts an embodiment of the trough 56 disposed around the rotating material moving device 14 for providing the first fluid 54 to the input material 8 in a concentrated and directed manner.

A plurality of injection ports (only 52a and 52d are labeled) are depicted disposed within the trough 56. Furthermore, a first fluid reservoir 57 can be in fluid communication with the trough 56. Vapor 58 and liquid 60 are shown within the first fluid reservoir 57.

Figure 5:
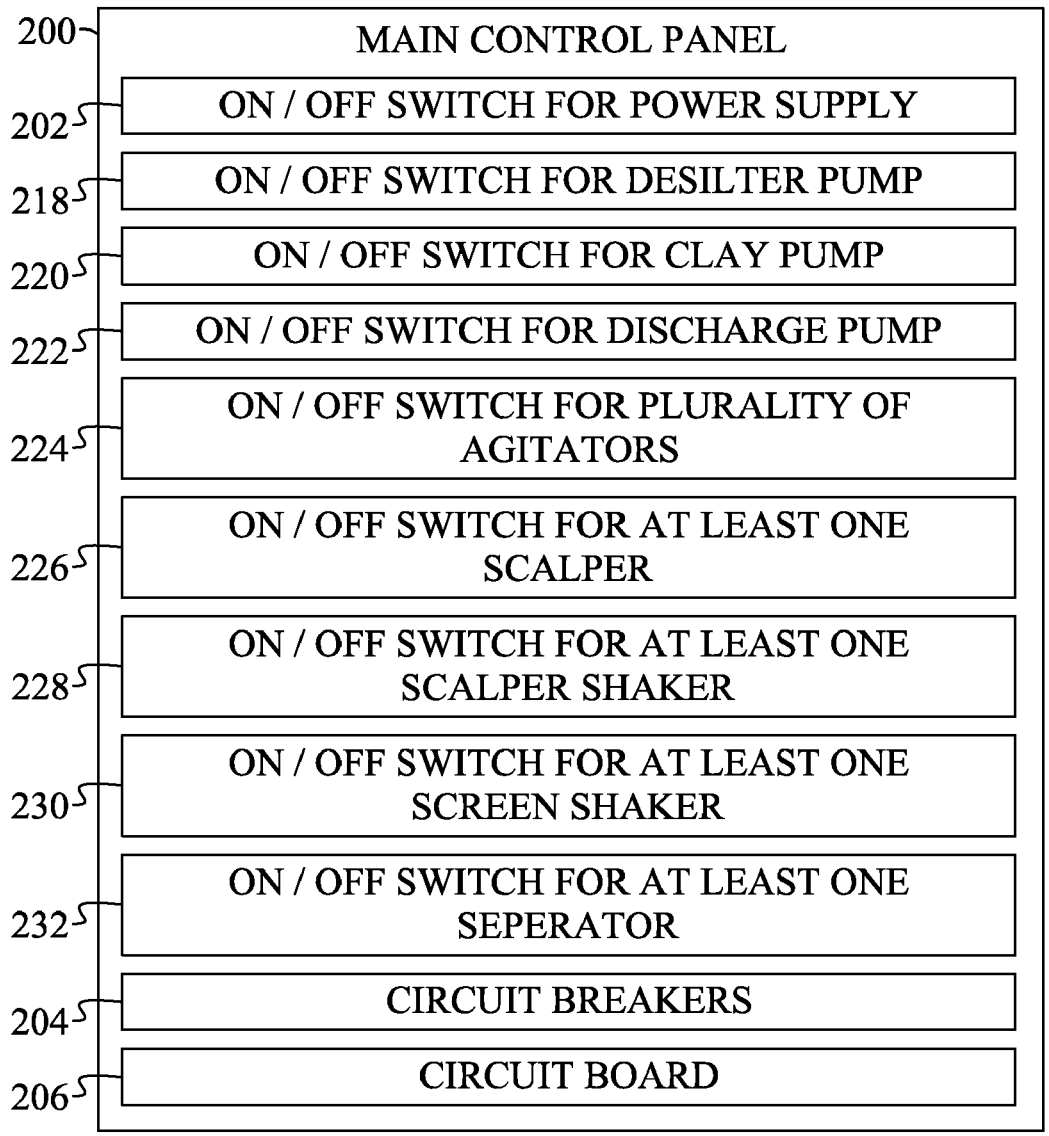
FIG. 5 is a detail of the internals of an illustrative main control panel of FIG. 1.

FIG. 5 depicts an embodiment of the main control panel 200. The main control panel 200 is shown with an on/off switch for the power supply 202, an on/off switch for the desilter pump 218, an on/off switch for the clay pump 220, an on/off switch for the discharge pump 222, an on/off switch for each of the plurality of agitators 224, an on/off switch for each of the at least one scalper 226, an on/off switch for the at least one scalper shaker 228, an on/off switch for the at least one screen shaker 230, and an on/off switch for the at least one separator 232. The main control panel is also depicted with circuit breakers 204 and a circuit board 206.

Figure 6:
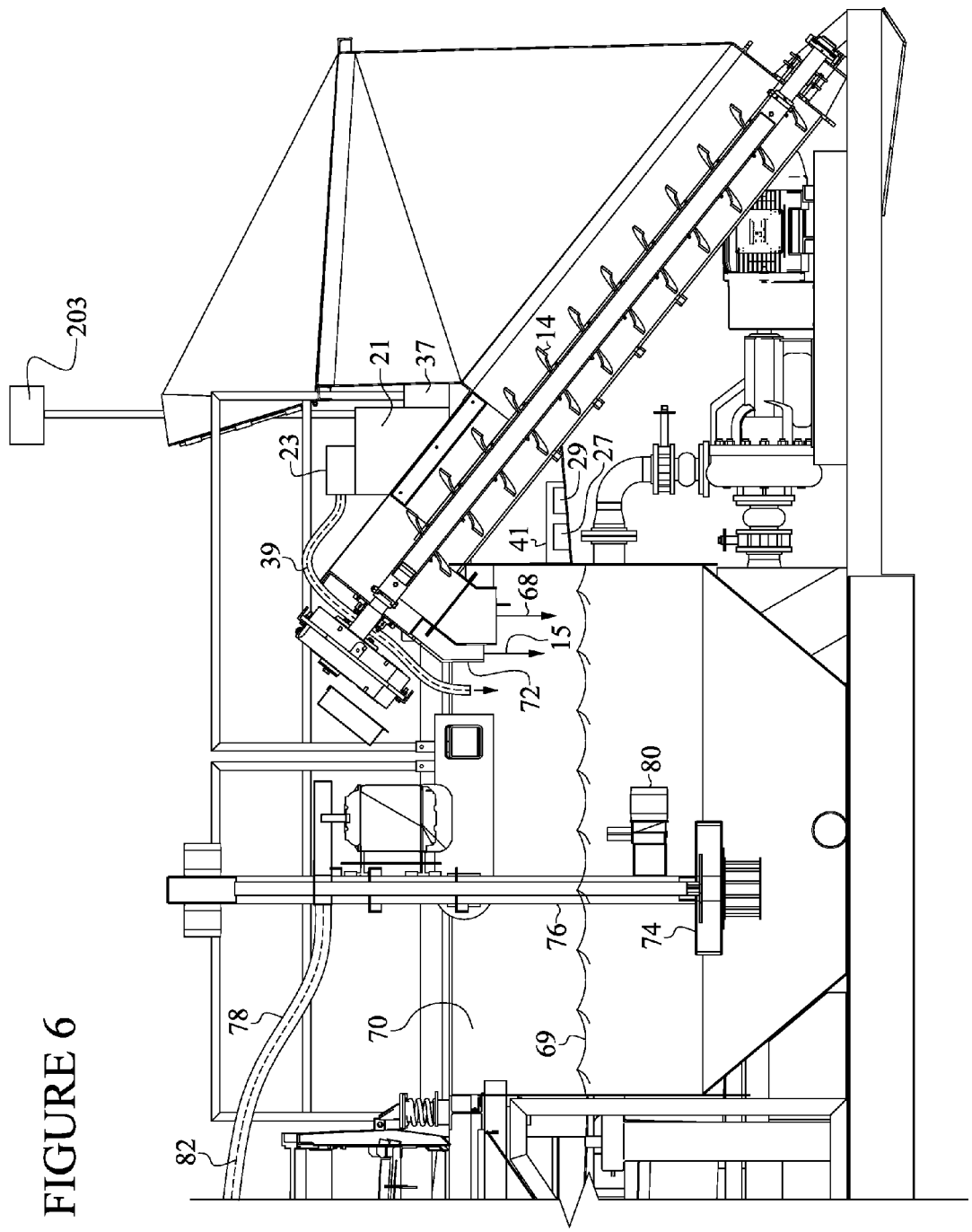
FIG. 6 is a detail of an illustrative separation tank.

FIG. 6 depicts an embodiment of the separation tank 70. A first slurry 68 is shown flowing from the rotating material moving device 14 into the separation tank 70. A fluid injection port 72 for flowing fluid 15 into the separation tank 70 can be seen proximate the location where the first slurry 68 flows into the separation tank 70. Separation tank pump 74 is disposed within the separation tank 70 and connected to fluid supply loop 76. Agitator port 80 is also depicted. Separation tank outlet 78 is shown for flowing particulate effluent 82 from the separation tank 70. Contaminate 69 is also depicted within the separation tank 70.

FIG. 6 also depicts a light 203, an extractor 41, adsorbent material 27, absorbent material 29, fluid pump 21, and contaminate recovery section second outlet 37. The fluid pump 21 can be connected to at least one contaminate recovery section second outlet 37 for flowing contaminate 69 from the contaminate recovery section through a filter 23 forming a recycle fluid 39, and further reintroducing the recycle fluid 39 to a member of the group consisting of: the initial separation section 73, the scalper tank 100, the desilting tank 114, the clay slurry tank 130, or combinations thereof, which are not shown in this Figure.

Figure 7:
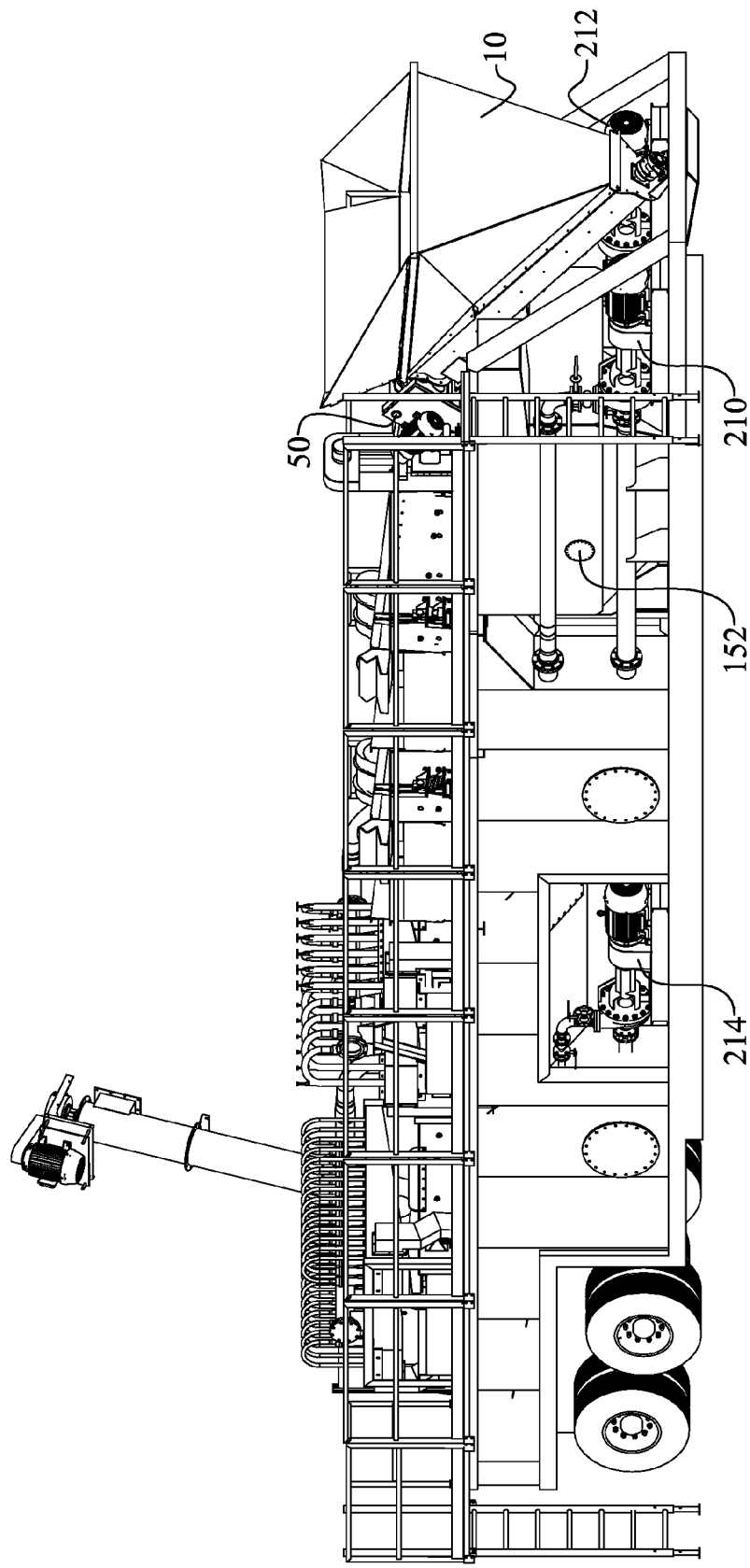
FIG. 7 is a view showing illustrative clay pump motors.

FIG. 7 shows the desilting pump 210, the clay pump 212, and the discharge pump 214 disposed on the hydrocarbon removal mobile unit 6. Also shown is the material moving motor emergency stop 50, the hopper 10, and the heated fluid dispersal manifold 152.

Figure 8:
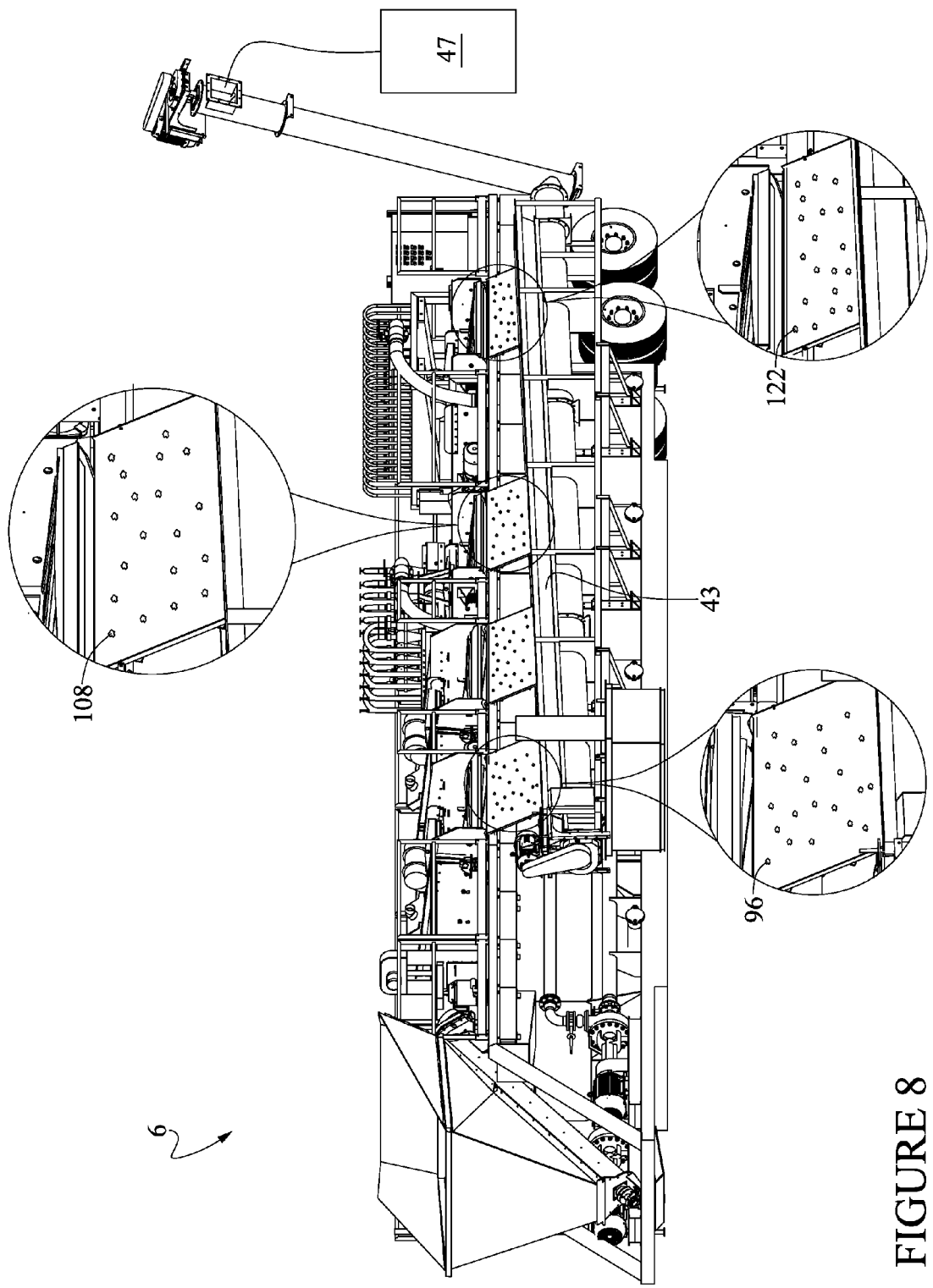
FIG. 8 is a right side isometric view of the trailer mounted unit.

FIG. 8 is a right side isometric view of an embodiment of the hydrocarbon removal mobile unit 6 showing the material removal device 43 and the ancillary location 47. The first 96 hydrocarbon extracted particulate, second 108 hydrocarbon extracted particulate and third 122 hydrocarbon extracted particulate are depicted flowing to the material removal device 43.

Figure 9:
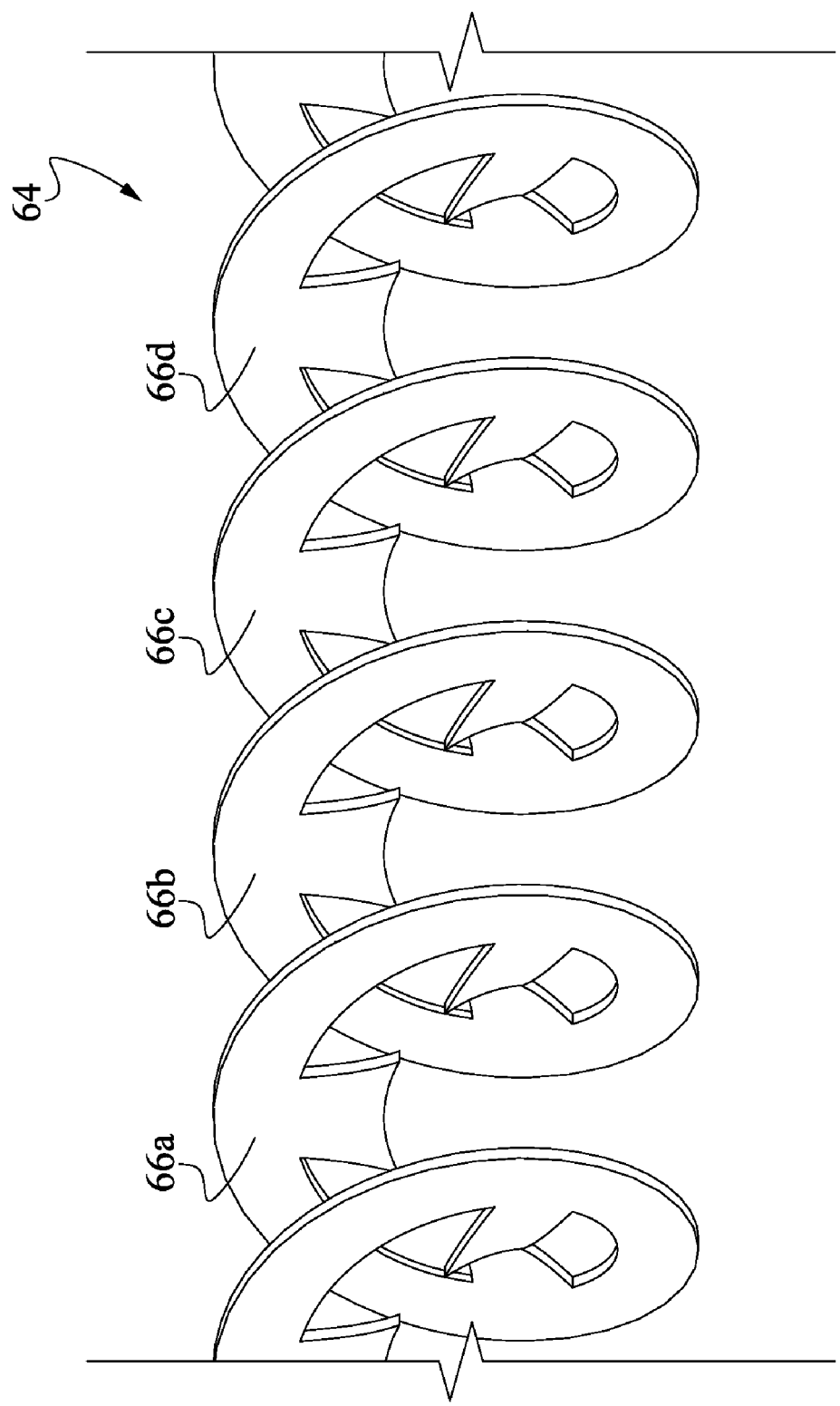
FIG. 9 is a detailed view of an illustrative shaftless auger.

FIG. 9 is a detailed view of an embodiment of the shaftless auger 64 with flightings 66 a-d.

Figure 10:
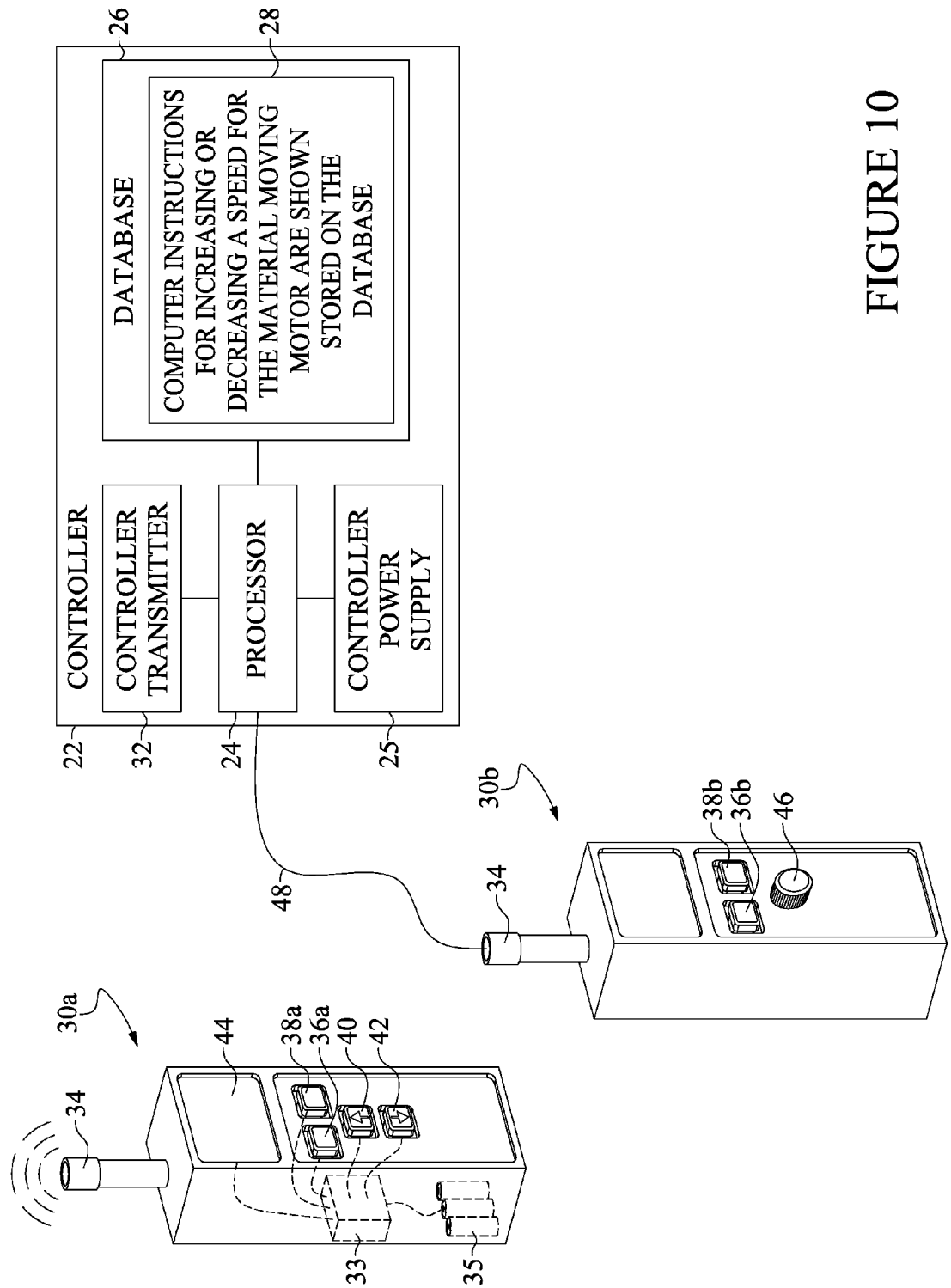
FIG. 10 is a diagram of an illustrative controller with an illustrative remote control device.

FIG. 10 is a diagram of the controller 22 with remote control device 30a usable in the invention. Remote control device 30a has an increase speed potentiometer 40, a decrease speed potentiometer 42, a display 44, a remote control power supply 35, remote control on and off switches 36a and 38a, a remote control circuit board 33, and a transmitter/receiver 34.

Remote control device 30b is depicted with a remote control on switch 36b, a remote control off switch 38b, and a speed control knob 46.

Controller 22 is depicted with a controller transmitter 32 for communicating with the transmitter/receiver 34. An electrical signal cable 48 is shown connecting the remote control device 30b with a processor 24, for providing communication between the remote control device 30b and the controller 22. A database 26 is shown within the controller 22 in communication with the processor 24. Computer instructions 28 for increasing or decreasing a speed for the rotating material moving device are shown stored on the database 26. The controller 22 is also shown with a controller power supply 25.

Figure 11:
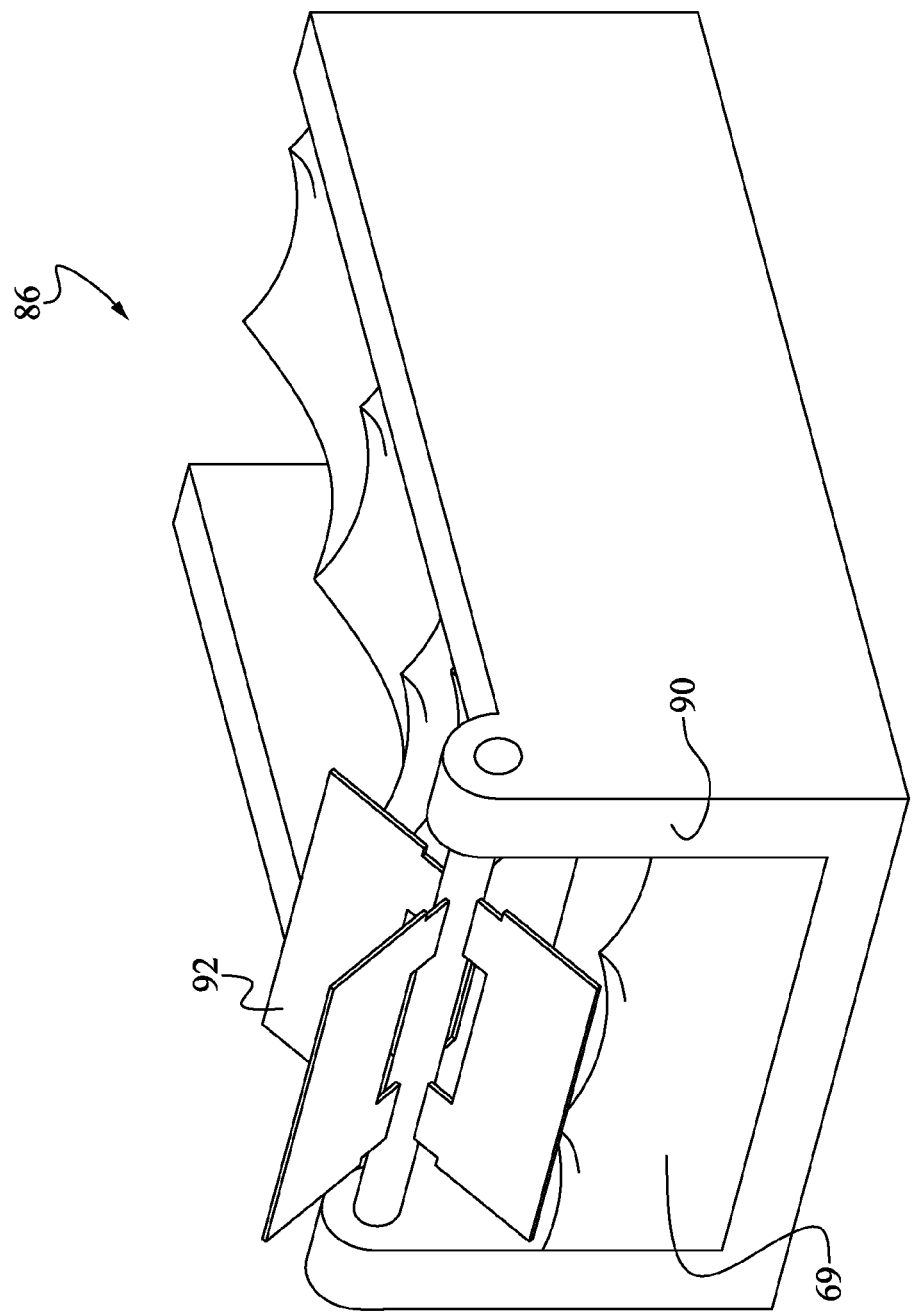
FIG. 11 is a detail of an illustrative separator with rotating paddlewheel.

FIG. 11 depicts a detailed view of an embodiment of the separator 86 with a rotating paddlewheel 92 disposed above a weir 90. The contaminate 69 is shown within the weir 90.

Figure 12:
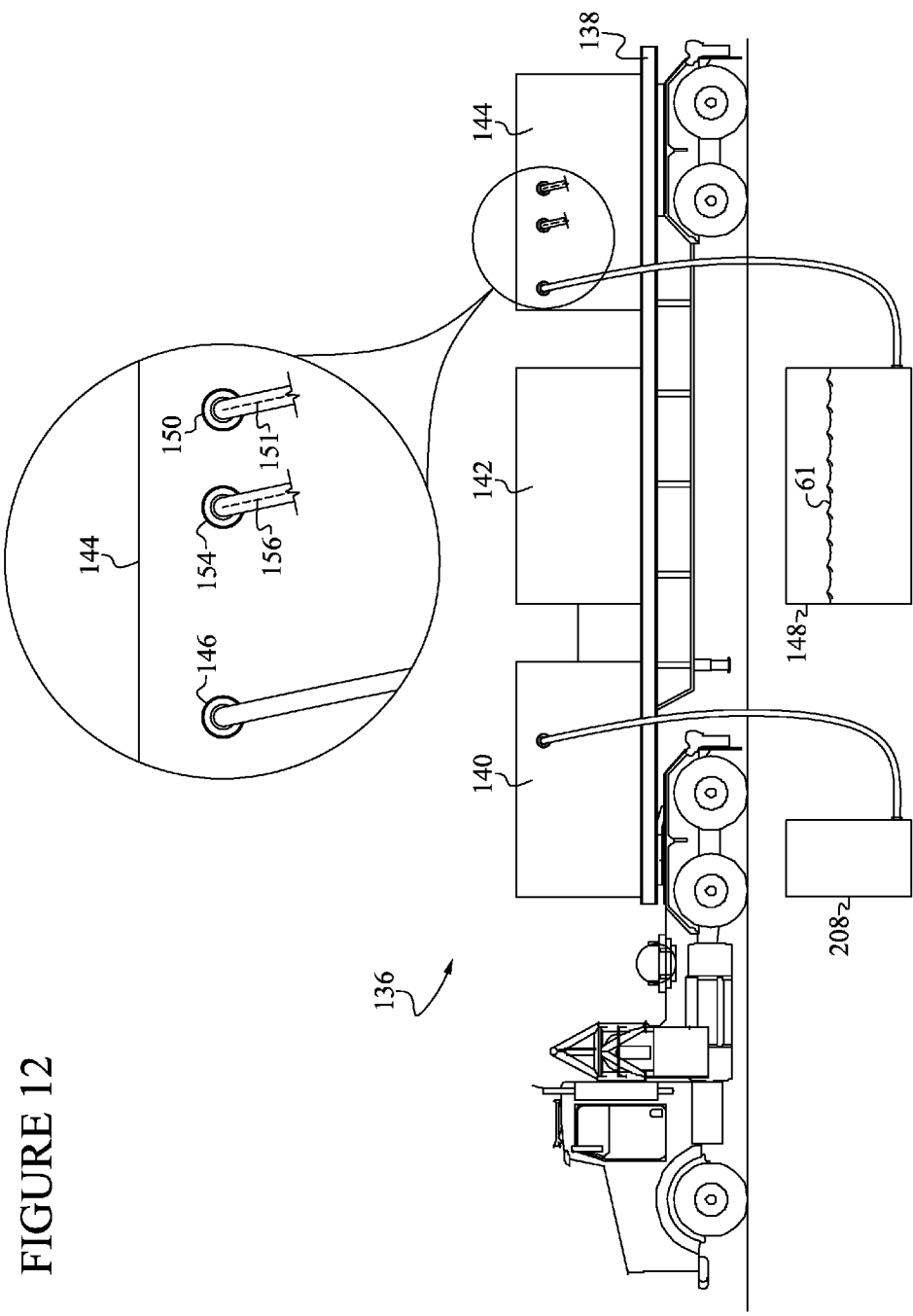
FIG. 12 depicts an embodiment of an illustrative heating and power support unit.

FIG. 12 depicts an embodiment of the heating and power supply unit 136 of the system. The heating and power supply unit is shown with a trailer 138, a quick release cable 208 for connecting the heating and power supply unit 136 to the hydrocarbon removal mobile unit 6. The heating and power supply unit 136 includes a generator 140, a fuel tank 142, and a boiler 144.

The boiler is depicted with a boiler heated second fluid return 154, a heated fluid outlet 150, and a second fluid intake 146. The second fluid intake is shown in fluid communication with a second fluid source 148 with a second fluid 61. Heated second fluid 151 travels from the heated fluid outlet 150 to the dispersal manifold 152 located on the hydrocarbon removal mobile unit 6. Condensed second fluid is show flowing into the boiler heated second fluid return 154.

FIG. 13A depicts an embodiment of a clarifying mobile unit 237 disposed on a trailer 238. The clarifying mobile unit is shown with a slurring inlet port 240 and polymer injector 241 for injecting a polymer 242 into a slurry, which can be the fourth slurry.

The clarifying mobile unit 237 also has a flocculation chamber 246 in fluid communication with the slurry inlet port, a sludge outlet port 248 for flowing sludge 249, a clarified fluid conduit 250, a polymer switch 158, and a flocculation power supply 244. Clarified fluid 247 is shown flowing through the clarified fluid conduit 250. A polymer slurry 245 is shown flowing into the flocculation chamber.

FIG. 13B depicts an embodiment of the clarifying mobile unit 237 on the trailer 238 having a dewatering centrifuge 252 in communication with the slurry inlet port 240. Sludge 249 is shown flowing from the dewatering centrifuge 252 through the sludge outlet port 248. Clarified fluid 247 is shown flowing through the clarified fluid conduit 250 from the dewatering centrifuge 252. The dewatering centrifuge 252 is shown in communication with a centrifuge power supply 254.

In an embodiment, the extractor can be a centrifuge operable from the main power supply connection from the power supply unit.

Figure 14:
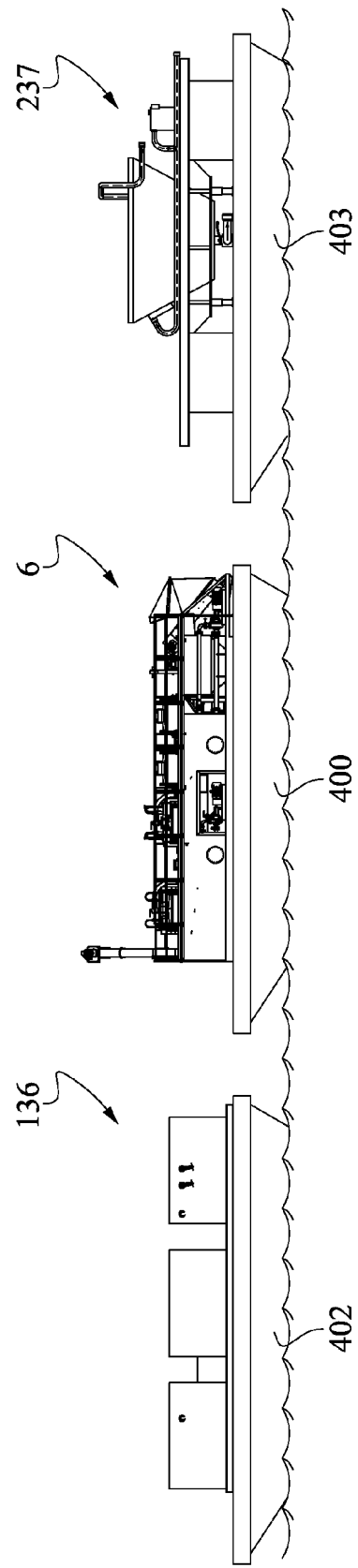
FIG. 14 shows a floating vessel mounted unit.

FIG. 14 shows an embodiment of the invention wherein each of the three major components of the system is floating support vessels.

The first floating support vessel 400 is shown with the hydrocarbon removal mobile unit 6. The second floating support vessel 402 is shown the heating and power support unit 136. The third floating support vessel 403 is shown with the clarifying mobile unit 237. Each floating support vessel is shown with the components that are describes above as being trailer mounted, however, no trailers are involved in the floating vessels. Any of the various tanks of the system can be formed integrally with the hull of the vessels.

Another embodiment contemplates that the vessels may act as support units, with the various tanks, pumps and components being removable and modular and reconfigurable, allowing different shapes and increase versatility for the units.

While these embodiments have been described with emphasis on the embodiments, it should be understood that within the scope of the appended claims, the embodiments might be practiced other than as specifically described herein.

What is claimed is:

1. A system for removing at least one of hydrocarbons and heavy metals, the system comprising:
a hydrocarbon removal mobile unit comprising:
 (i) a first trailer;
 (ii) a hopper for receiving input material;
 (iii) a rotating material moving device disposed in the hopper for ensuring continuous flow of input material through the hopper;
 (iv) a controller for controlling the speed of the rotating material moving device;
 (v) a plurality injection ports adjacent the rotating material moving device within the hopper for introducing a first fluid to the input material forming a first slurry;
 (vi) a separation tank for receiving the first slurry, agitating the first slurry, and allowing particulate to settle, forming a separated contaminate and a particulate effluent, wherein the separation tank comprises:
  an initial separation section for receiving the first slurry;
  a separation tank pump in the initial separation section, wherein the separation tank pump is connected to a fluid supply loop and an injection port for injecting fluid into the first slurry as it flows from the rotating material moving device, and the separation tank further has a separation tank outlet port in fluid communication with a scalper screen;
  an agitator port for recirculating the first slurry from the initial separation section through the fluid supply loop;
  at least one contaminate recovery section in fluid communication with the initial separation section;
  an extractor associated with each of the contaminate recovery sections for soaking up hydrocarbons in the contaminate; and
  a separator disposed between the initial separation section and each contaminate recovery section;
 (vii) at least one scalper screen for receiving the particulate effluent and separating the particulate effluent into a first hydrocarbon extracted particulate with a diameter greater than 1000 microns and a second slurry;
 (viii) at least one scalper tank wherein each scalper tank comprises a scalper agitator forming a suspension from the second slurry;
 (ix) at least one de-silting hydrocyclone for receiving the suspension and removing a second hydrocarbon extracted particulate with a diameter greater 75 microns, forming a third slurry;
 (x) a desilting screen for receiving the second hydrocarbon extracted particulate;
 (xi) a desilting tank containing a desilting agitator for receiving the third slurry and forming an agitated third slurry;
 (xii) a plurality of clay extractors for receiving the agitated third slurry and removing a third hydrocarbon extracted particulate with a diameter greater than 10 microns, forming a fourth slurry;
 (xiii) a clay screen for receiving the third hydrocarbon extracted particulate;
 (xiv) a clay slurry tank with a clay agitator for receiving the fourth slurry;

(xv) a heating device disposed within the clay slurry tank and in fluid communication with at least one of the desilting tank, the scalper tank, and the initial separation section; and a heating and power support unit for connecting to the hydrocarbon removal mobile unit providing power and a heated second fluid to the hydrocarbon removal mobile unit, wherein the heating and power support unit comprises:

(i) a second trailer adjacent the first trailer;
(ii) a generator disposed on the second trailer;
(iii) a fuel tank disposed on the second trailer and in communication with the generator;
(iv) a boiler in communication with the generator;
(v) a fluid intake in the boiler for receiving the second fluid from a second fluid source; and
(vi) a heated fluid outlet of the boiler in communication with a heated fluid dispersal manifold disposed on the hydrocarbon removal mobile unit.

2. The system for removing hydrocarbon of claim 1, wherein the heated fluid dispersal manifold additionally transfers the heated second fluid to the first fluid reservoir for injecting the heated second fluid as the first fluid.

3. The system for removing hydrocarbon of claim 1, further comprising a clarifying mobile unit for connecting the hydrocarbon removal mobile unit and in communication with the generator disposed on the second trailer, the clarifying mobile unit comprising:

a clarifying trailer;
a slurry inlet port disposed on the clarifying trailer for receiving the fourth slurry;
a polymer injector in communication with the slurry inlet port, for injecting a polymer into the fourth slurry, forming a polymer slurry;
a flocculation chamber disposed on the clarifying trailer for receiving the polymer slurry, for mixing and separating a clarified fluid from the polymer slurry and forming a sludge;
a clarified fluid conduit for flowing the clarified fluid from the flocculation chamber to the separation tank; and
a sludge outlet port for flowing the sludge from the flocculation chamber to the rotating material removal device or to the ancillary location.

4. The system for removing hydrocarbon of claim 1, further comprising a dewatering centrifuge to receive the fourth slurry and to apply a centrifugal force for separation of particulate and liquid.

5. The system for removing hydrocarbon of claim 1, wherein walls of the clay slurry tank extend higher than the desilting tank but allow fluid from the clay slurry tank to flow into the desilting tank when the fluid in the clay slurry tank exceeds a preset limit.

6. The system for removing hydrocarbon of claim 1, wherein walls of the desilting tank extend higher than the scalper tank and allow fluid in the desilting tank to flow into the scalper tank when fluid in the desilting tank exceeds a preset limit.

7. The system for removing hydrocarbon of claim 1, wherein the fourth slurry flows into a fluid trough for recycling into the separation tank.

8. The system for removing hydrocarbon of claim 1, wherein the rotating material moving device is a rotating auger.

9. The system for removing hydrocarbon of claim 8, wherein the rotating auger is a shaftless auger, which comprises a plurality of helical flightings.

10. The system for removing hydrocarbon of claim 1, wherein the controller comprises a processor powered by a controller power supply, and wherein the processor is further connected to controller data storage containing controller computer instructions for increasing or decreasing the speed of the rotating material moving device.

11. The system for removing hydrocarbon of claim 10, wherein the controller further comprises a controller transmitter/receiver and the remote control has a remote control transmitter/receiver for providing wireless remote control to the controller.

12. The system for removing hydrocarbon of claim 11, wherein the remote control has a remote control circuit board connected to a remote control power supply, and wherein the remote control circuit board communicates with the remote control transmitter/receiver, and further wherein the remote control comprises:

a remote control on-switch;
a remote control off-switch;
an increase speed potentiometer;
a decrease speed potentiometer; and
a display.

13. The system for removing hydrocarbon of claim 11, wherein the remote control comprises a remote control on-switch, and a remote control off-switch, and a speed control member for transmitting signals to the controller that increase or decrease speed of the rotating material moving device.

14. The system for removing hydrocarbon of claim 1, further comprising: a material moving motor emergency stop in communication with the rotating material moving device.

15. The system for removing hydrocarbon of claim 1, further comprising a trough disposed around the rotating material moving device for assisting in flowing the input material to the separation tank.

16. The system for removing hydrocarbon of claim 15, further comprising a removable sleeve disposed within the trough and for further supporting the plurality of injection ports.

17. The system for removing hydrocarbon of claim 1, further comprising at least one remote control for providing control signals to the controller.

18. The system for removing hydrocarbon of claim 1, wherein the first fluid is injected into the input material from a first fluid reservoir and wherein the first fluid reservoir contains a vapor, a liquid, or a mixture of vapor and liquid.

19. The system for removing hydrocarbon of claim 1, further comprising a water spray bar attached to the separation tank to allow the contaminates to flow to the separator.

20. The system for removing hydrocarbon of claim 1, wherein the separator is a member of the group consisting of: a weir, a rotating paddle wheel or combinations thereof, for flowing contaminate to the contaminate recovery sections.

21. The system for removing hydrocarbon of claim 1, further comprising a desilting trough for receiving the third slurry from the desilting hydrocyclone and passing the third slurry to the desilting tank.

22. The system for removing hydrocarbon of claim 1, further comprising a clay trough for receiving the fourth slurry from the clay extractors and passing the fourth slurry to the clay slurry tank.

23. The system for removing hydrocarbon of claim 1, further comprising a fourth slurry pump for receiving the fourth slurry from the clay extractors and passing the fourth slurry to the clay slurry tank.

24. The system for removing hydrocarbon of claim 1, wherein from 20 and 60 clay extractors are used.

25. The system for removing hydrocarbon of claim 1, wherein the heating device is a heat exchanger for flowing heated fluid or steam through the heat exchanger to heat the surrounding slurry.

26. The system for removing hydrocarbon of claim 1, further comprising at least one light for night time use and to maintain continuous use of the hydrocarbon removal device, further wherein the at least one light is connected to a trailer mounted power supply.

27. The system for removing hydrocarbon of claim 1, wherein the extractor comprises a pump connected to at least one contaminate recovery section second outlet for flowing contaminate from the contaminate recovery section through a filter forming a recycle fluid, and further reintroducing the recycle fluid to a member of the group consisting of: the initial separation section, the scalper tank, the desilting tank, the clay slurry tank, or combinations thereof.

28. The system for removing hydrocarbon of claim 1, wherein the extractor comprises a member of the group: an adsorbent material, an absorbent material or combinations thereof, disposed within at least one contaminate recovery section.

29. The system for removing hydrocarbon of claim 1, further comprising a material removal device for receiving first hydrocarbon extracted particulate, the second hydrocarbon extracted particulate, and third hydrocarbon extracted particulate, and for flowing each hydrocarbon extracted particulate to an ancillary location.

30. A floating hydrocarbon removal mobile unit comprising:
   a first floating support vessel comprising:
   (i) a hopper for receiving input material;
   (ii) a rotating material moving device disposed in the hopper for ensuring continuous flow of input material through the hopper;
   (iii) a controller for controlling the speed of the rotating material moving device;
   (iv) a plurality injection ports adjacent the rotating material moving device within the hopper for introducing a first fluid to the input material forming a first slurry;
   (v) a separation tank for receiving the first slurry, agitating the first slurry, and allowing particulate to settle, forming a separated contaminate and a particulate effluent, wherein the separation tank comprises:
      an initial separation section for receiving the first slurry;
      a separation tank pump in the initial separation section, wherein the separation tank pump is connected to a fluid supply loop and an injection port for injecting fluid into the first slurry as it flows from the rotating material moving device, and the separation tank further has a separation tank outlet port in fluid communication with a scalper screen;
      an agitator port for recirculating the first slurry from the initial separation section through the fluid supply loop;
      at least one contaminate recovery section in fluid communication with the initial separation section;
      an extractor associated with each of the contaminate recovery sections for soaking up hydrocarbons in the contaminate; and
      a separator disposed between the initial separation section and each contaminate recovery section;
   (vi) at least one scalper screen for receiving the particulate effluent and separating the particulate effluent into a first hydrocarbon extracted particulate with a diameter greater than 1000 microns and a second slurry;
   (vii) at least one scalper tank wherein each scalper tank comprises a scalper agitator forming a suspension from the second slurry;
   (viii) at least one de-silting hydrocyclone for receiving the suspension and removing a second hydrocarbon extracted particulate with a diameter greater 75 microns, forming a third slurry;
   (ix) a desilting screen for receiving the second hydrocarbon extracted particulate;
   (x) a desilting tank containing a desilting agitator for receiving the third slurry and forming an agitated third slurry;
   (xi) a plurality of clay extractors for receiving the agitated third slurry and removing a third hydrocarbon extracted particulate with a diameter greater than 10 microns, forming a fourth slurry;
   (xii) a clay screen for receiving the third hydrocarbon extracted particulate;
   (xiii) a clay slurry tank with a clay agitator for receiving the fourth slurry; and
   (xiv) a heating device disposed within the clay slurry tank and in fluid communication with at least one of the desilting tank, the scalper tank, and the initial separation section;
   a second floating vessel comprising a heating and power support unit for connecting to the hydrocarbon removal mobile unit providing power and a heated second fluid to the hydrocarbon removal mobile unit, wherein the heating and power support unit comprising:
   (i) a second vessel adjacent the first vessel;
   (ii) a generator disposed on the second vessel;
   (iii) a fuel tank disposed on the second vessel and in communication with the generator;
   (iv) a boiler in communication with the generator;
   (v) a fluid intake in the boiler for receiving the second fluid from a second fluid source; and
   (vi) a heated fluid outlet of the boiler in communication with a heated fluid dispersal manifold disposed on the hydrocarbon removal mobile unit;
   a third floating vessel comprising a clarifying mobile unit for connecting the hydrocarbon removal mobile unit and in communication with the generator disposed on the second vessel the clarifying mobile unit comprising:
   (i) a clarifying vessel
   (ii) a slurry inlet port disposed on the clarifying vessel for receiving the fourth slurry;
   (iii) a polymer injector in communication with the slurry inlet port, for injecting a polymer into the fourth slurry, forming a polymer slurry;
   (iv) a flocculation chamber disposed on the clarifying vessel for receiving the polymer slurry, for mixing and separating a clarified fluid from the polymer slurry and forming a sludge;
   (v) a clarified fluid conduit for flowing the clarified fluid from the flocculation chamber to the separation tank; and
   (vi) a sludge outlet port for flowing the sludge from the flocculation chamber to the rotating material removal device or to the ancillary location.

* * * * *

UNITED STATES PATENT AND TRADEMARK OFFICE
CERTIFICATE OF CORRECTION

PATENT NO.         : 7,727,389 B1                          Page 1 of 1
APPLICATION NO.    : 12/562905
DATED              : June 1, 2010
INVENTOR(S)        : Doug Mallonee and Edward Beverly Moe It is certified that error appears in the above-identified patent and that said Letters Patent is hereby corrected as shown below:

Title Page, Item (30) Assignee's name should be changed from "Green Intectuac Properties" to
-- Green Intellectual Properties, LLC --

Signed and Sealed this

Twenty-ninth Day of June, 2010

David J. Kappos
*Director of the United States Patent and Trademark Office*